United States Patent Office 2,999,969
Patented Sept. 12, 1961

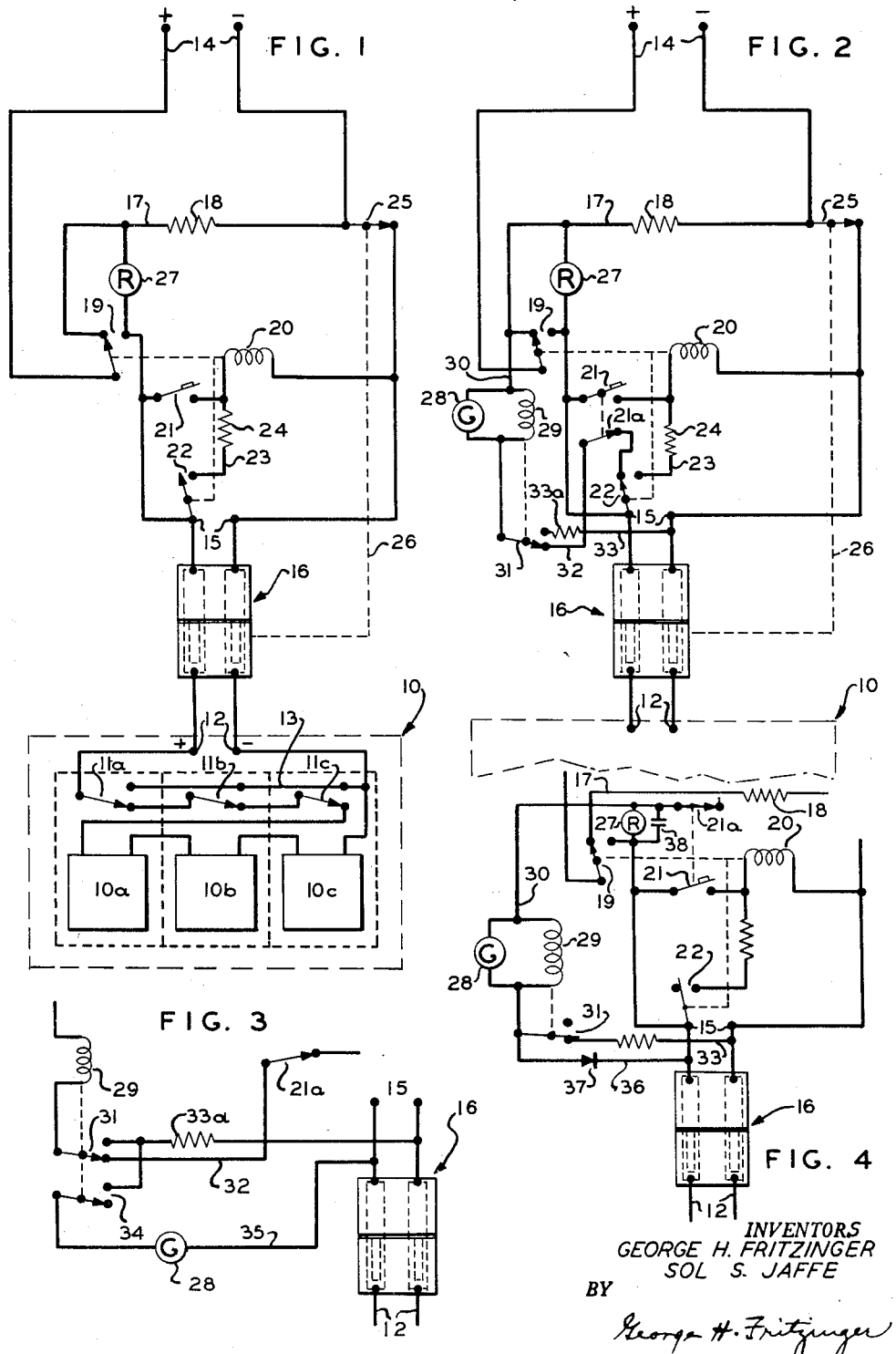

2,999,969
SIGNALING ARRANGEMENTS FOR BATTERY CHARGING CIRCUIT
George H. Fritzinger and Sol S. Jaffe, West Orange, N.J., assignors, by mesne assignments, to The Electric Storage Battery Company, Philadelphia, Pa., a corporation of New Jersey
Filed Dec. 17, 1958, Ser. No. 780,981
11 Claims. (Cl. 320—48)

This invention relates to charging circuits for hermetically sealed storage batteries and more particularly to novel signaling arrangements for indicating the operating state of such charging circuits and of the batteries being charged.

Sealed storage batteries are provided typically with one or more control switches, usually one for each cell of the battery, which is operated whenever the respective cell of the battery reaches a predetermined state of charge and of discharge. These switches may be operated in various ways such, for example, as by the pressure of the gases evolved in the cells. Cells of the nickel-cadmium alkaline type are typically arranged so that oxygen is evolved from the positive electrode when the battery is overcharged and from the negative electrode when the battery is overdischarged, this being so that undesirable hydrogen gas is never evolved during the use and during charging of the battery. During standby and during discharge the internal pressure subsides by recombination of the oxygen gas with the negative electrode. A pressure switch operated whenever the evolved oxygen gas has accumulated to a predetermined pressure is a useful means for controlling the termination of charging of a hermetically sealed battery.

Our invention relates particularly to a novel and simple indicating means for charging circuits of the character described and claimed in the U.S. application of George M. Anderson and Sol S. Jaffe, entitled Battery Charging Circuit and filed on even date herewith. A feature of this charging circuit is that it can be activated only when a battery to be charged has been positively electrically connected to the output terminals of the charging circuit. The charging circuit is adapted especially for batteries whose control switches are so connected as to break the battery circuit and provide a short circuit across the battery terminals when one of the control switches of the battery is operated. It is important therefore that there be provided a suitable indicator to apprise the operator not merely as to when the charging is terminated but further as to when the internal pressure has subsided in the charged battery to cause the operated battery switch to return to normal position for only then is the battery ready for use.

An object of our invention is to provide a simple signaling means for apprising the operator as to when the battery is undergoing charge and is charged but not yet ready for use.

A further object is to fulfill the aforestated objective in connection with the aforementioned charging circuit by means consisting of a single signaling device or lamp.

A further object is to provide the aforestated charging circuit with novel and simple signaling means which will differentially indicate as between when the battery is undergoing charge and when it is charged but not yet ready for use.

A further object is to provide an alternative signaling means for the above charging circuit which is operative only when a battery is charged and ready for use.

Further objects are to provide a charging circuit for a sealed battery which has two signal indicators for differentially indicating (1) when a battery has been connected to the charging circuit and charging has started, (2) when the charging is terminated but the internal pressure of the battery has not subsided to return the battery switch and render the battery ready for use, and (3) when the battery is charged and ready for use.

A further object is to provide a signaling means as aforestated which is operative also to provide a warning if the charging source should fail.

Still further objects are to provide simple and economical means and circuit arrangements for attaining the aforestated objectives in a dependable manner.

In the description of our invention reference is had to the accompanying drawings, of which:

FIGURE 1 is a schematic circuit diagram of the aforementioned charging circuit in which there is incorporated a single signal lamp for indicating both when a sealed battery is being charged and when the battery has become charged but is not yet ready for use;

FIGURE 2 is a schematic circuit diagram of the above charging circuit in which there is incorporated also a second signal lamp and a control circuit therefore for differentially indicating as between when a sealed battery has been charged but is not ready for use and when the battery has been both charged and is ready for use;

FIGURE 3 illustrates a modification in the circuit of FIGURE 2 whereby the second signal lamp becomes operative only when the battery is both charged and ready for use;

FIGURE 4 illustrates another modification in the circuit of FIGURE 2 which simplifies the circuitry and changes the operation of the signal control relay.

In the circuit of FIGURE 1 there is shown a charging apparatus for a sealed battery 10 having, for example, three cells 10a, 10b, and 10c provided respectively with pressure switches 11a, 11b and 11c normally standing in the positions shown. These switches, which are of the single-pole double-throw type, are connected serially in the battery circuit so that they normally connect the cells in series with the battery terminals 12. However, a jumper 13 runs from each of the normally open contacts of the pressure switches 11 to one of the battery terminals, and the pole of the first of the switches 11 is connected to the other of the battery terminals so that the cells are disconnected from these terminals and the terminals are shorted when the pressure rises in any of the cells sufficiently to operate the respective pressure switch.

The charging circuit for each individual battery 10 has a pair of input leads 14 to be connected to a D.C. charging source (not shown), and has a pair of output leads 15 for connection through a plug type connector 16 to the battery terminals 12. A load circuit 17 provided with a load resistor 18 is connected across the input terminals to simulate the load condition on the charging source before the charging circuit is activated which is provided by the battery when the charging circuit is in operation. Connection of the load circuit to the input leads is made through a single-pole double-throw transfer switch 19 of an activating relay 20 of the charging circuit. This relay is connected across the output terminals 15 through a pushbutton switch 21 so that the relay is first operated by power from the battery to be charged when the pushbutton switch is pressed closed. As the relay 20 is operated the switch 19 is thrown to shift connection of the charging source from the load circuit to the battery, and a second switch 22 of the relay is operated to close a holding circuit 23 for the relay in shunt with the pushbutton switch. In this holding circuit there is a resistor 24 which provides a suitable cutdown of the voltage of the charging source across the relay after the relay is activated. In order that a disconnecting of the battery from the charging circuit while the battery is undergoing charge will force a dropout of the relay 20 to return the connection of the input leads to the load circuit 17, a switch 25 is connected in one side of the charging circuit and is controlled by the connector 16 as indicated by the coupling 26 diagrammatically indicated.

Whenever any one of the cells of the battery becomes charged to the point where the evolved gases in the cell cause operation of the respective pressure switch 11, the battery is disconnected and a short is provided across the output leads 15 to remove operating current from the relay 20. The relay therefore drops out to return connection of the charging source to the load circuit whereby to maintain a constant load on the charging source. In order that continuity of the circuit will not be broken as the switch 19 is operated this switch may be of the make-before-break type.

Our invention is in an improved signaling arrangement for charging circuits of the type here described. This signaling arrangement comprises a signal lamp 27 preferably adapted to provide a red light as indicated by the letter R, which is connected across the contacts of the transfer switch 19. This signal lamp preferably has a resistance of the order of 10 or more times that of the load resistor 18. When a battery to be charged is first connected to the charging circuit by the connector 16 the signal lamp 27 does not light because the voltage of a so-called discharged battery is still typically a major fraction of the voltage of the charge source, leaving an insufficient voltage across the lamp to cause it to glow. For example, the charging source will typically have about 4.3 volts and the battery to be charged will have or will acquire almost immediately, even from such small current as passes through the lamp 27, a voltage of at least 3 volts, leaving at most only 1.3 volts across the lamp before the charging circuit is activated whereas a minimum of about 2 volts is required to operate the lamp. However, when the charging circuit is activated by pressing the pushbutton 21 the transverse switch 19 is thrown to the right and connects the lamp 27 across the charging source through the load resistor 18. Since the lamp has a substantially greater resistance than that of the load resistor, the lamp will now be lit by current from the plus side of the charging source through the switch 19 via its right contact, the lamp 27, and the load resistor 18 to the negative side of the charging source. Furthermore, when one of the battery switches 11 is operated responsive to the battery having become charged the relay 20 is dropped out and the switch 19 is returned to its left contact. The full voltage of the charging source is then applied across the lamp 27 in the reverse direction from that just described, the energizing circuit being now from the plus side of the charging source through the switch 19 via its left contact, the lamp 27, and the operated battery switch 11 via the leads 15 and connector 16 to the negative side of the charging source. However, when the internal pressure in the battery subsides to the point where the battery switch 11 is returned to its normal position the voltage of the battery is reintroduced into the lamp circuit just mentioned, in opposition to that of the charging source, to cause the lamp to go out. Thus, a single lamp is connected to give an indication not only during charging but also during the ensuing interval following the termination of charging until the battery pressure switch is returned to render the battery ready for use. Such return of the pressure switch will occur typically within about 30 minutes after charging is terminated by reason of the absorption or recombination of the oxygen in the cell with the negative electrode.

It is found that by a very simple addition to the circuit of FIGURE 1, an additional signal can be provided running either continuously from the instant the battery becomes charged or from the instant the battery becomes ready for use until the battery is disconnected from the charging circuit. For example, as shown in FIGURE 2, a second signal lamp 28—which is preferably adapted to provide a green light as indicated by the letter G—is controlled to provide a signal running from the instant the battery becomes charged until the battery is disconnected. In this circuit the signal lamp 28 is connected in parallel with a signal control relay 29 and the parallel arrangement is connected in a circuit 30 running from the left contact of the transverse switch 19 through the pole and one contact of a switch 31 of the signal relay 29, lead 32, a second normally closed switch 21a of the pushbutton switch 21 and the back or normally made contact of the hold-circuit switch 22 of the activating relay 20 to the plus side of the output leads 15. When the signal control relay 29 is operated its switch 31 makes with a lead wire 33 running to the negative side of the output leads 15 to provide a hold-circuit for the signal relay, as will appear. Preferably for this purpose, the switch 31 is made of the make-before-break type. The operation of this circuit is as follows:

When a battery is first connected to the charging circuit of FIGURE 2, the switch 25 will be closed but charging will not yet have started and neither signal light will be operated because the battery 10 is connected serially with both the red lamp 27 and with the green lamp 28 and relay 29 in voltage opposition to that of the charging source. When the pushbutton 21 is pressed to operate the relay 20 from the battery 10, the transfer switch 19 is thrown to the right to provide operating current to the red lamp 27 via the load resistor 18 and the switch 22 is thrown to the right to provide a holding circuit for the activating relay 20. However, neither the green lamp 28 nor the relay 29 is now operated because their circuit is first opened by the switch 21a when the pushbutton was pressed and is maintained open by the switch 22 having broken with its left contact when the activating relay 20 was operated. Only the red lamp 27 is therefore now operated. When the battery becomes charged one of its switches 11 will operate to provide a short across the battery terminals 12 and this will drop out the relay 20 to return both switches 19 and 22 to their left contacts. The signal lamp 28 and relay 29 are now both operated from the charging source through the lower contact of switch 31, switch 21a, left contact of switch 22, battery switch 11 and switch 25. The resultant operation of switch 31 to its upper contact now provides a holding circuit for the signal relay 29 across the charging source until the switch 25 is opened when the battery is disconnected from the charging circuit. Since the red light from the lamp 27 is still on, as before described, there is now obtained both red and green lights to indicate that the battery is charged but not yet ready for use since its pressure switch 11 is still operated. When the internal pressure subsides to return the pressure switch 11 to normal position, the voltage of the battery 10 is reintroduced across the leads 15. This places the battery 10 again in series with the lamp 27 across the charging source to cause the red light to go out. The reintroduction of the battery voltage across the leads 15 has now however no effect on the lamp 28 and signal relay 29 because these are now energized through the holding circuit 33 independently of the battery. Therefore, when the charged battery becomes ready for use only a green light is provided. When the charged battery is next disconnected the switch 25 is opened to drop out both the signal relay 29 and lamp 28. Thus, by only two signal lights and very simple circuitry distinguishing signal indicators are provided for the three battery states, as follows: a red light during charging, both red and green lights when the battery is charged but not yet ready for use, and a green light only when the battery is charged and ready for use.

If there should occur a power failure as from open circuiting or shorting of the line leading to the input leads 14 before the charging circuit has been activated or after the battery has been charged and the relay 20 dropped out, both the red and green lamps will be operated by current from the battery through the load resistor 18 and the switch 25. Still further, an energizing circuit is provided for the relay 29 through its switch 31 at its lower contact and the load resistor 18, or through the leads 14 if shorted, to cause the relay to operate as a buzzer. In order that the operation of the relay 29 as a buzzer will not place any undue current drain on the battery through the contacts of the switch 31 and the holding circuit 33, this holding circuit is provided with a suitable load resistor 33a. If the power failure should occur while a battery is undergoing charge the red lamp 27 will remain operated by current from the battery and the battery will continue to hold the relay 20 operated but the signal relay 29 is not now operated by reason of its circuit being open at the left contact of the switch 22. Thus, the present circuit has the feature of providing an ample warning in the form of a buzzer and/or red light to the operator whenever a power failure occurs, and in response thereto he will disconnect the batteries from the charging circuit to prevent their discharge should the power failure be for a prolonged period.

By the modification of the circuit of FIGURE 2 shown in FIGURE 3 a different signalling is obtained. This modification resides in connecting the lamp 28 through an additional normally open switch 34 of the signal relay 29 in a circuit 35 connected across the output leads 15 of the charging circuit. When charging is terminated to operate the relay 29 as above described, the green lamp 28 is connected across the output leads but is at first not operated because these leads are shorted by the battery switch 11. However, when the battery switch 11 is returned to normal position to render the battery ready for use, the red lamp 27 receives no longer energizing current as before described but the green lamp 28 is now operated by current from the battery. Therefore, in this signaling arrangement a red light is obtained from the instant charging is started until the battery is charged and ready for use, and a green light is obtained from the instant the battery becomes ready for use until it is disconnected from the charging circuit.

A further modification of the circuit of FIGURE 2, shown in FIGURE 4, resides in removing the lead connection 32 running from the lower contact of the switch 31 of the signal relay 29 and providing a permanent lead connection 36 from the relay 29 and green lamp 28 to the plus side of the output leads 15 through a rectifier 37 poled in opposition to that of the battery. The operation of the lamp 28 is the same in this arrangement as in the circuit of FIGURE 2 in that the green light comes on by current from the charging source through the rectifier 37 and the operated battery switch 11 when the battery becomes charged and the lamp is held operated thereafter through the holding circuit 33 until the battery is next disconnected. A difference in operation in this arrangement is that upon failure of the charging source, the signal relay 29 is now prevented from being operated as a buzzer by current from the battery because of the blocking action of the rectifier 37.

Further, the switch 21a tied to the pushbutton switch 21 may be relocated as shown in FIGURE 4 to have the benefit not only of maintaining the safety feature it had in FIGURE 2 of preventing both relays 20 and 29 from being connected across the charging source when the pushbutton switch 21 is pressed closed, but also of eliminating a possible operating circuit for the relay 20 through the lamp 27. Furthermore, a condenser 38 may advantageously be placed across the lamp 27 because if the connector 16 should be pulled apart while a battery is still undergoing charge the switch 25 would be opened and a moment later the relay 20 would drop out but during that moment the full charging current would pass through the lamp via the resistor 18 since the charging source is one of substantially constant current. This condenser will absorb the momentary surge of current which would pass through the lamp until the switch 22 of the activating relay is returned to its left contact and so protect the lamp from being burned out.

The embodiments of our invention herein particularly shown and described are intended to be illustrative and not necessarily limitative of our invention since the same are subject to changes and modifications without departure from the scope of our invention, which we endeavor to express according to the following claims:

We claim:

1. In a charging circuit for a sealed storage battery having a switch operable from a normal position as the battery reaches a predetermined state of charge and returnable to normal position during subsequent standby of the battery: the combination of activating means for starting the charge of said battery, means controlled by said battery switch as the switch is operated from normal position for releasing said activating means to terminate the charging of the battery, a signaling device, and means controlled by said activating means and said battery switch for placing said signaling device in operation when charging is started, for maintaining said signalling device in operation after charging of the battery is terminated and said battery switch is operated, and for placing the signaling device out of operation when the battery is charged and the battery switch is returned to normal position.

2. In a charging circuit for a sealed storage battery having a switch operable from a normal position as the battery reaches a predetermined state of charge and returnable to normal position during subsequent standby of the battery: the combination of a load resistor connected across the input of the charging circuit for simulating the load of a battery to be charged on the charging source before the charging circuit is activated, activating means operable to shift connection of the input of the charging circuit to said battery, means responsive to said battery switch as it is operated from normal position for returning said activating means to unoperated position, a signaling device having a resistance substantially greater than that of said load resistor, and circuit means controlled by said activating means for serially connecting said signaling device and battery across the input of the charging circuit with the battery in voltage opposition to that of the charging source to prevent operation of the signaling device when said activating means is not operated and for connecting said signaling device across the charging source through said load resistor with operation of the signaling device when said activating means is operated.

3. The combination set forth in claim 2 wherein said battery switch is operable to disconnect the battery from its terminals and provide a short across said terminals when the battery switch is operated whereby upon said activating means returning to unoperated position responsive to operation of said battery switch said signaling device is connected across the charging source and maintained by the charging source in operation.

4. In a charging circuit for a sealed storage battery having a switch operable from a normal position for disconnecting the battery from its terminals and shorting the terminals when a cell of the battery reaches a predetermined state of charge, said charging circuit comprising a pair of input leads to be connected to a charging source of voltage and a pair of output leads to be connected to a battery to be charged; the combination of a load circuit for said input leads, a relay having a single-pole double-throw switch normally connecting said load circuit across said input leads and operable by activation of the relay to transfer connection of said input leads to said output leads, means for activating said relay by power from the battery to be charged and for causing the relay to be dropped out responsive to operation of said battery switch when the battery becomes charged, and a signal device connected between one of said output leads and one side of said load circuit for receiving operating current from the charging source through said switch of said relay in its operated position and through said load circuit during charging of the battery and from said charging source through said switch of said relay in its unoperated position and through said battery switch after charging is terminated.

5. In a charging circuit for a sealed storage battery having a switch operable from a normal position by the battery when the battery reaches a predetermined state of charge and returnable to normal position during standby of the battery after being charged, said charging circuit including a pair of input leads to be connected to a charging source and a pair of output leads to be connected to a battery to be charged: the combination of a load circuit for connection across said input leads before said charging circuit is activated, means for connecting a battery to said output leads, a relay having a switch for connecting said load circuit across said input leads and activatable to transfer connection of said input leads from said load circuit to said output leads, means for dropping out said relay by said battery switch when the battery becomes charged, a first signaling device operable between two different indicating conditions, means for operating said signaling device responsive to activation of said relay and for returning said signaling device to unoperated condition responsive to return of said battery switch to normal position, a second signaling device, and means for operating said second signaling device upon said relay dropping out to terminate charge of the battery and for returning said second signaling device to unoperated position responsive to said connecting means as the battery is disconnected from said charging circuit.

6. In a charging circuit for a sealed storage battery having a switch operable from a normal position as the battery reaches a predetermined state of charge: the combination of means for connecting a battery to said charging circuit, means for activating said charging circuit to start the charging of said battery, means controlled by said battery switch for releasing said activating means to terminate the charging of the battery as said battery switch is operated from normal position, a signaling device, means responsive to operation of said battery switch for placing said signaling device in operation, and means responsive to said connecting means as the battery is disconnected from said charging circuit for placing said signaling device out of operation.

7. In a charging circuit for a sealed storage battery having a switch operable from a normal position as the battery reaches a predetermined state of charge and returnable to normal position during standby of the battery after being charged: the combination of means for connecting a battery to said charging circuit, means for activating said charging circuit to start the charging of said battery, means controlled by said battery switch for releasing said activating means to terminate the charging of the battery as the battery switch is operated from normal position, a signaling device, means prepared for operation by the operation of said battery switch from normal position and thereupon operated upon return of said battery switch to normal position for placing said signaling device in operation, and means responsive to said connecting means as the battery is disconnected from said charging circuit for returning said signaling device to unoperated condition.

8. In a charging circuit for a sealed storage battery having a pressure switch operable from a normal position for disconnecting the battery from its terminals and shorting said terminals when the battery reaches a predetermined state of charge, said charging circuit having input terminals to be connected to a voltage source and output terminals to be connected to a battery to be charged, an activating relay, a load resistor and means controlled by said relay for connecting said input terminals across said load resistor before the relay is activated and across said output terminals when the relay is activated: the combination of means for connecting a battery to be charged to said output terminals, means for activating said relay by power from said battery and for holding the relay activated until the battery switch is next operated, a buzzer, and means serially connecting said buzzer and battery across said load resistor with the battery in voltage opposition to said voltage source when the relay is not operated whereby to normally maintain said buzzer inoperative but to cause operation of the buzzer by current from the battery through said load resistor upon failure of said voltage source.

9. In a charging circuit for a sealed storage battery having a pressure switch operable from a normal position for disconnecting the battery from its terminals and shorting said terminals when the battery reaches a predetermined state of charge, said charging circuit having input terminals to be connected to a voltage source and output terminals to be connected to a battery to be charged, an activating relay, a load resistor and means controlled by said relay for connecting said input terminals across said load resistor before the relay is activated and across said output terminals when the relay is activated: a signal device and signal relay connected in parallel, said signal relay having a single-pole double-throw switch and said activating relay having a second switch closed when the relay is not operated, an energizing circuit connecting said signal device and relay in series with said battery across said load resistor through said switch of said signal relay and said second switch of said activating relay, a holding circuit for said signal relay controlled by said switch of the relay for maintaining the signal relay operated when once activated, and means for dropping out said signal relay responsive to disconnecting the battery from the charging circuit.

10. The combination set forth in claim 9 including a circuit having a push switch therein for initially operating said activating relay by current from said battery, said activating relay having a holding circuit rendered operative to maintain the relay operated when having been once activated, and a switch in said energizing circuit of said signal relay for holding said energizing circuit open while said push switch is held closed.

11. In a charging circuit for a sealed storage battery having a pressure switch operable from a normal position for disconnecting the battery from its terminals and shorting said terminals when the battery reaches a predetermined state of charge, said charging circuit having input terminals to be connected to a voltage source and output terminals to be connected to a battery to be charged, an activating relay, a load resistor and means controlled by said relay for connecting said input terminals across said load resistor before the relay is activated and across said output terminals when the relay is activated: a signal device and signal relay connected in parallel, an energizing circuit connecting said signal device and relay serially with said battery across said load resistor, said energizing circuit including a rectifier poled in opposition to said battery to enable said signal device and relay to be operable only by current from said voltage source when said activating relay is not operated, a holding circuit for said signal relay controlled by a switch of the relay for maintaining the relay and signal device operated once said signal relay is first operated, and means for dropping out said signal device and signal relay responsive to disconnecting the battery from the charging circuit.

References Cited in the file of this patent

UNITED STATES PATENTS

| 2,296,924 | Heyer et al. | Sept. 29, 1942 |
| 2,366,505 | Fletcher | Jan. 2, 1945 |

FOREIGN PATENTS

| 524,906 | Great Britain | Aug. 16, 1940 |